United States Patent [19]
Sullivan

[11] 3,914,679
[45] Oct. 21, 1975

[54] HIGH VOLTAGE TRANSISTORIZED POWER SUPPLY EMPLOYING SWITCHING REGULATOR AND D.C.-A.C. CONVERTER CIRCUITRY

[75] Inventor: James F. Sullivan, Stow, Mass.

[73] Assignee: Honeywell Information Systems Inc., Waltham, Mass.

[22] Filed: Apr. 15, 1974

[21] Appl. No.: 461,081

[52] U.S. Cl. .................. 321/2; 321/18; 323/17; 323/DIG. 1
[51] Int. Cl.² .......................... H02M 5/453
[58] Field of Search ............ 321/2, 18; 323/DIG. 1, 323/17; 178/DIG. 11

[56] References Cited
UNITED STATES PATENTS

| | | | |
|---|---|---|---|
| 3,350,620 | 10/1967 | Barron | 321/2 |
| 3,559,030 | 1/1971 | Bussard | 321/2 |
| 3,697,854 | 10/1972 | Berger | 323/DIG. 1 |
| 3,701,937 | 10/1972 | Combs | 321/2 |
| 3,743,887 | 7/1973 | Keough et al. | 323/DIG. 1 |
| 3,761,796 | 9/1973 | Jensen | 321/2 |
| 3,777,248 | 12/1973 | Vermolen | 321/2 |
| 3,806,791 | 4/1974 | Johnson | 321/2 |
| 3,818,128 | 6/1974 | Chambers et al. | 178/DIG. 11 |
| 3,818,306 | 6/1974 | Marini | 321/2 |
| 3,818,308 | 6/1974 | Tamari | 321/2 |
| 3,839,668 | 10/1974 | Black | 321/18 X |

Primary Examiner—Gerald Goldberg
Attorney, Agent, or Firm—David A. Frank; Ronald T. Reiling

[57] ABSTRACT

An electronic power supply employs a high voltage transistor in a switching regulator, coupled to a d.c.-a.c. converter stage employing two high voltage transistors, and an auxiliary transformer for initial activation of the supply. A transformer secondary winding is employed in conjunction with diodes within the d.c.-a.c. converter to prevent both transistors in this stage from operating simultaneously. A slow voltage buildup sequencing circuit is employed within the control loop of the switching regulator to prevent the occurrence of an unwanted overvoltage fault condition.

6 Claims, 8 Drawing Figures

HIGH VOLTAGE TRANSISTORIZED POWER SUPPLY EMPLOYING SWITCHING REGULATOR AND D.C.-A.C. CONVERTER CIRCUITRY

BACKGROUND OF THE INVENTION

1. Field of the Invention

This invention relates generally to electronic power supplies and more particularly to power supplies utilizing high voltage transistors, which provide the advantages of higher efficiency while still allowing for ridethrough (continuation of operation of the supply despite line voltage irregularities). These transistors are used in a switching regulator circuit and in a separate d.c. to a.c. converter circuit.

2. Description of the Prior Art

It is known in the prior art to use high voltage transistors (those rated at between 200–400 volts) in the d.c. to a.c. converter stage of electronic power supplies. These transistors offer the advantage of higher efficiency than their lower-voltage counterparts. Sometimes these transistors have been used in a switching regulator stage (which stage serves to carefully regulate the output voltage of the power supply). (See for example, "High Efficiency Modular Power Supplies Using Switching Regulators," Hewlett-Packard Journal, December, 1973. This supply, however, really employs high voltage transistors not in a switching regulator but in a d.c.-d.c. converter which is pulse modulated. Since the pulse width in a d.c.-d.c. converter can never be greater than 50 percent, the instability problem mentioned in the second paragraph of page 17 of the cited article is always present; this necessitated the inclusion of a cumbersome circuit which adds a parabolic waveform to the triangular feedback waveform, as described on page 17.) To date, a simple circuit has not been designed that combines the higher efficiency of these high voltage transistors in both a switching regulator stage and a d.c. to a.c. converter stage while providing for at least a 100 millisecond ridethrough (continuation of operation of the supply should the line voltage drop or discontinue; this is important so that slight irregularities in the line voltage do not cause the supply to shut down.)

Figure 0:
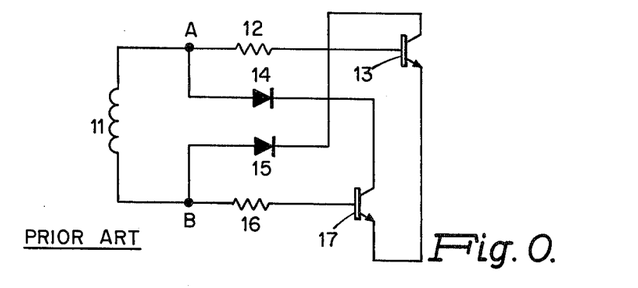
FIG. 0 is a schematic diagram of a prior art device to inhibit simultaneous turn-on of two transistors.

Within the d.c.-to a.c. converter stage, something must be incorporated to inhibit simultaneous turnon of both transistors, which would short the transformer windings and cause extremely high peak currents. FIG. 0 is a schematic of how this problem was solved by the prior art. A disadvantage of this method is that the voltage at point B, is a function of the voltage across diode 15 and the collector-emitter voltage of transistor 13, which in turn is a variable function of the variable base and collector currents of transistor 13. Similarly, the voltage at point A is a function of the voltage across diode 14 and the collector-emitter voltage of transistor 17, which is a variable function of the variable base and collector currents of transistor 17. Thus, the circuit is not adequately reliable with high voltage transistors because the voltages which are responsible for turning off the bases, those at points A and B, may vary within a relatively wide range and hence are unacceptably inaccurate.

What is needed is a power supply that will combine the advantages (higher efficiency) of the new high voltage transistors in both the switching regulator stage and the d.c. to a.c. converter stage with a safe, reliable, efficient means of inhibiting two high voltage transistors from operating simultaneously within the d.c. to a.c. converter stage.

OBJECTS

It is therefore an object of the present invention to provide an improved electronic power supply.

It is a further object of the present invention to provide for an electronic power supply utilizing high voltage transistors.

It is a still further object of the present invention to provide an improved electronic power supply utilizing high voltage transistors in both the switching regulator stage and in a high frequency d.c. to a.c. converter stage.

It is yet another object of the present invention to dispense with the use of a step-down transformer by allowing for the direct rectification of the input a.c. line.

It is still a further object of the present invention to provide safe, reliable and efficient means for preventing two high voltage transistors within the d.c. to a.c. converter stage of an electronic power supply from operating simultaneously.

It is yet another object of the present invention to provide an electric power supply with 100 milliseconds of line ridethrough.

It is still another object of the present invention to reduce the size and weight of filters in an electronic power supply.

These and other features of the invention will be understood upon reading of the following descriptions together with the drawings.

SUMMARY OF THE INVENTION

The aforementioned and other objects of the present invention are accomplished by utilizing high voltage transistors in two separate stages of the power supply, a switching regulator (including control loop) stage which regulates the output voltage of the supply, and a d.c. to a.c. converter stage, which is utilized to give line isolation. Use of these transistors allows for high efficiency and the elimination of heavy magnetic components since the a.c. input is rectified directly off the line without the necessity for a step-down transformer. The size and weight of the magnetic components is reduced and fewer capacitors are necessary. Use of the high voltage transistors in both stages permits the duty cycle of the converter to be 100 percent; this means that lighter, smaller output filters can be used.

The power supply provides for 100 milliseconds of line ridethrough by means of the placement of electrical storage means in the input rectifier and filter circuit. That is, the supply can operate for at least 100 milliseconds should the input line voltage be disturbed or taken away, which makes the supply particularly useful as an auxiliary supply powering a succession of other power supplies, for example, in an electronic data processing configuration. In such a utilization, the instant supply must have at least the maximum amount of ridethrough of all the other supplies and preferably a little more.

The circuit to inhibit simultaneous turn-on was designed by utilizing a third secondary of the transformer as a feedback winding to inhibit turn-on of either transistor when the other transistor is still on, i.e. during the storage time of the other transistor. Thus the exact voltage required to shut off the base can be specified, because when one transistor is on, the transformer has a polarity associated with it. Diodes are employed in the circuit to hold one of the bases off if the other transistor is still on.

A slow voltage buildup sequencing circuit is employed within the control loop of the switching regulator to prevent the occurrence of an unwanted overvoltage fault condition.

DESCRIPTION OF THE PREFERRED EMBODIMENT

Operation of the Preferred Embodiment

Figure 1:
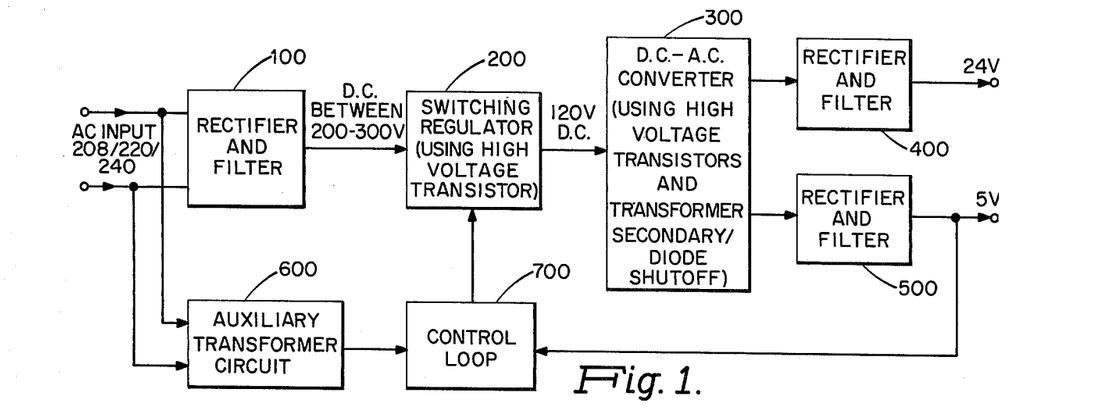
FIG. 1 is a block diagram of the invention.

Referring now to FIG. 1, the input voltage of this power supply is typically 208, 220 or 240 volts a.c. The input frequency is typically 50 or 60 Hertz. It is rectified and filtered by a rectifier and filter 100. The ridethrough capability for the power supply is gathered by filtering right off the line. The allows the utilization of less capacitance at the higher voltage for the energy required for the ridethrough. By ridethrough, we mean that capability of the supply to run after the line has been disturbed or taken away. The amount of ridethrough provided by this supply is between 100 milliseconds and 300 milliseconds. This allows the instant supply to be particularly useful for providing auxiliary voltage for a series of power supplies, for example, in an electronic data processing configuration. The output of rectifier and filter 100 is between 200 and 300 volts direct current which feeds into switching regulator 200. Switching regulator 200 is used to carefully and minutely regulate the output voltage of the power supply. Control loop 700 senses one of the output voltages of the supply, the 5 volt output, and feeds this back to the switching regulator, adjusting the duty cycle of the switching regulator. The d.c. pulses of the transistor are integrated by the choke and capacitor of the switching regulator circuit, providing a constant d.c. output of approximately 120 volts to the input of d.c.-a.c. converter 300. D.C. to a.c. converter 300 is used to give line isolation. It converts the input d.c. to a square wave a.c. It is driven by a 20 kilohertz oscillator (the switching regulator runs at approximately 2 kilohertz). The twin outputs of the d.c. to a.c. converter are rectified and filtered by rectifier and filter 400 and 500 respectively. Other output rectifier and filter circuits could be added without departing from the scope of the invention. The first output is at 24 volts, 8 amps with approximately 7½ percent error margin. The output of rectifier and filter 500 is at 5 volts and 8 amps with approximately 1 percent possible error deviation (static). Auxiliary transformer 600 is utilized for initial activation of the circuit. Control loop 700 requires auxiliary voltage when the A.C. is first applied to provide ridethrough capability before the 24 volt output is fully operational. The auxiliary voltage is fed into control loop 700 which will subsequently operate on its own voltage without requiring auxiliary transformer circuit 600.

Four high voltage transistors are used in the supply, one in the switching regulator which operates at 300 volts, one in the control loop for the switching regulator, also operating at 300 volts, and the other two in the d.c. to a.c. converter, operating at 120 volts. The advantage over conventional approaches is that efficiency is quite high because the current required for these elevated voltages is low for the power output. The power output of the supply is approximately 250 watts. The total efficiency is approximately 70 percent. Since the voltage across the transistors is constant, the current is the only variable component in the power equation. Values and operating points of the transistors are carefully chosen to prevent primary breakdown, which can result from either too much voltage or too much current being applied to the transistor or secondary breakdown (energy breakdown) which can result if the value of power times time running through the transistor is too high. This latter problem is solved by insuring that the transistors do not operate at temperatures higher than those recommended by the manufacturer.

Figure 2:
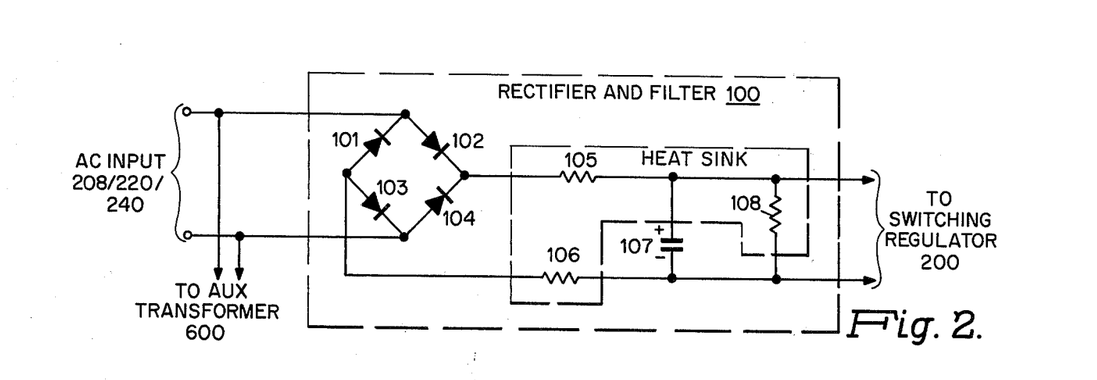
FIG. 2 is a schematic diagram of rectifier and filter 100 of the present invention.

Referring now to FIG. 2, diodes 101, 102, 103 and 104 constitute the input bridge rectifier. The diodes are typically 600 volts reverse diodes and rated at 4½ amps rms although other values can be used. The filter is composed of resistors 105 and 106 and capacitor 107. Resistors 105 and 106 are used as inrush limit requirements for safety reasons. Because of the relatively low power output, it is sufficient to simply put the resistors in and leave them in rather than switching them out at a later time (i.e. they would dissipate too much energy in a high power supply). Capacitor 107 is typically a 1.8 millifarad capacitor used for hold-up and for the filter. Resistor 108 at 15 kilo-ohms is a bleeder resistor used for safety, (e.g. Underwriter Laboratory) requirements.

Figure 3:
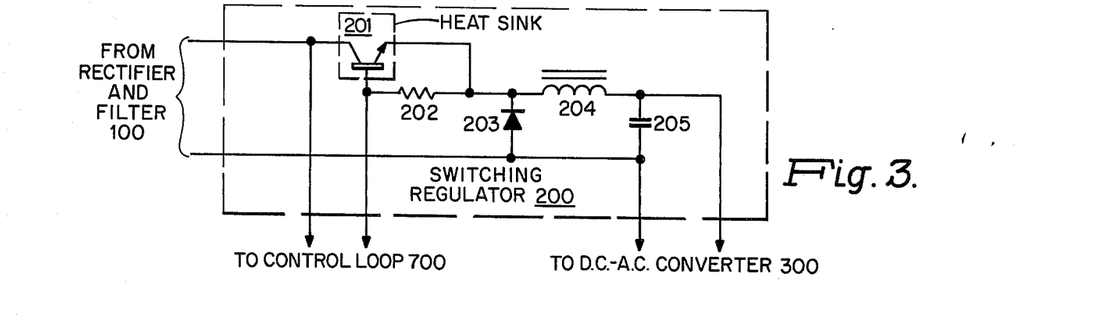
FIG. 3 is a schematic diagram of switching regulator 200 of the invention.

Referring now to FIG. 3, the switching regulator consists of transistor 201, diode 203, choke 204 and capacitor 205. Resistor 202 is simply a base-emitter resistor so that more sustaining voltage can be obtained out of the transistor. The transistor is a standard TO3 (TO3 is a standard industry designation which specifies size, location of emitter collector, and base pins, mounting holes, etc. RCA Corporation, "Power Transistors and Hybrid Circuits" page 114 (1973)) current rated at approximately 3½ amperes. It is used at its current rating. The value of choke 204 is chosen to keep the peak currents to a reasonable value (i.e. they must not exceed the safe operating currents of the transistor or diode or the ripple current rating of the capacitor) and is a guiding figure in any switching regulator, whether or not it utilizes a high voltage transistor. Capacitor 205 is utilized to keep down the ripple voltage at the output. Its value is relatively insignificant. Diode 203 is called a swinging diode and has a value which is non-critical. The most important value is the value of the choke, which keeps the peak currents down and that is a function of the driving frequency. A typical value is 36 millihenries. The basic theory of operation of the switching regulator is that transistor 201 is turned on for a certain period of time depending upon its driving waveform, driving current in through choke 204 where the energy is stored. When transistor 201 is on, the current goes from transistor 201 through choke 204 to the load. When transistor 201 is turned off, the current in the choke cannot discharge instantaneously so the current path now goes through choke 204, through the load (d.c.-a.c. converter 300) and up through swinging diode 203, which is used as a current carrying path after the transistor is switched off. The output voltage of a switching regulator of this type is directly proportional to the input voltage times the duty cycle of the switching regulator (which is the transistor itself).

Figure 4:
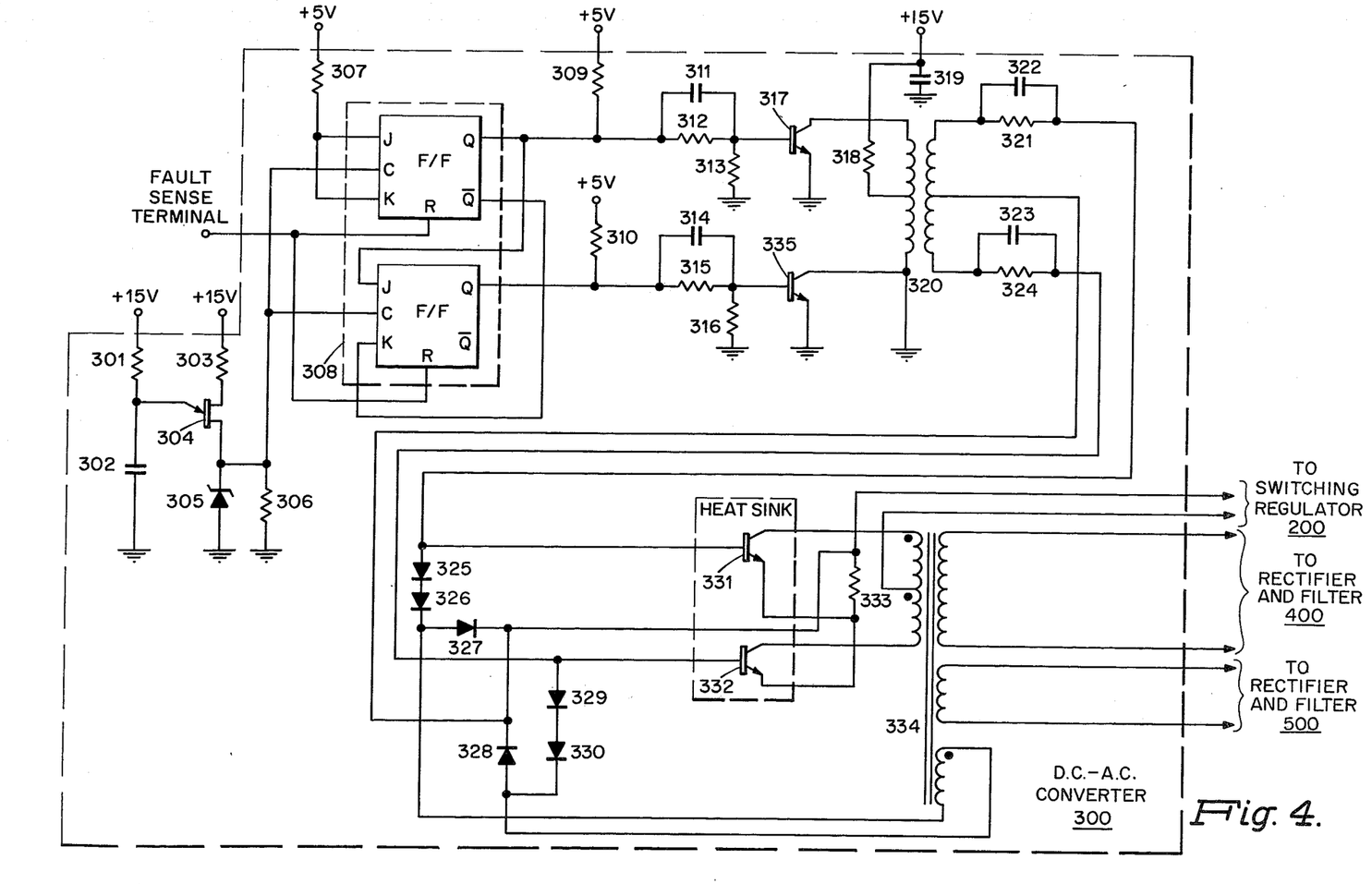
FIG. 4 is a schematic diagram of d.c.-a.c. converter 300 of the invention.

Referring now to FIG. 4, which is a schematic diagram for d.c.-a.c. converter 300, transformer 334 has three secondaries. Two secondaries are needed for the output voltages, one at 24 volts and the other at 5 volts. Additional output voltages can be produced by providing additional secondaries without departing from the scope of the invention. The third secondary is the feedback winding which is used to inhibit turn-on of either transistor 331 or transistor 332 when the other transistor is on (i.e. during the storage time of the other transistor). Diodes 325, 326, 327, 328, 329 and 330 are used to hold the base off if the other transistor is on. This is essential because if this were not done, both transistors would be on at the same time, shorting out the transformer and producing dangerously high peak currents. More specifically, when one of the transistors is on, the secondary of transformer 334 is biased in one direction or the other. The positive side of the secondary is at a potential equivalent to the voltage drop across one diode (approximately 0.7 volts) above relative ground. (The term "relative ground" means the voltage level of the negative input line to converter 300 from switching regulator 200.). The winding is biased by −4 volts and the negative side is tied via two diodes to the base of either transistor 331 or 332. Therefore, if there is an attempt to apply positive voltage to the base while the other transistor is on, that base is clamped to −1.9 volts, not allowing the transistor to turn on. The reason for two diodes in the base-to-secondary circuit is for initial turn-on consideration. If only one diode were used, it would inhibit the driving of the transistors at the commencement of the turn-on, since the base of the second transistor would be biased by −2.6 rather than −1.9 volts. Transistors 331 and 332 are high voltage transistors with a sustaining voltage of approximately 375 volts. 120 volts is fed into the d.c. to a.c. converter, but due to the transformer action, when one transistor is on, the other transistor has across it twice the battery voltage, namely 240 volts. With the addition of the diodes and the third winding on the secondary, one transistor is never initially turned on with 240 volts applied across it. It is turned on initially with approximately 150 volts applied across it, a very safe operating area for this type of transistor. Resistor 333 is used for thermal runaway conditions and also for core-walking conditions (i.e. direct current in the transformer). The d.c. to a.c. converter is an absolute necessity for line isolation. A major advantage in utilizing high voltages here is that the static losses of transistors 331 and 332 are minimized because of the high voltage, which enables the utilization of a low current (because the saturation voltages of the transistors are all basically the same). Therefore, the power loss in the circuit is minimal at the higher line voltages.

The driver for the d.c. to a.c. converter is comprised of unijunction transistor 304 in conjunction with resistors 301, 303 and 306; capacitor 302 and zener diode 305. This provides the base frequency into dual flip-flop 308. The output of dual flip-flop 308 is fed indirectly to transistors 317 and 335. This drives transformer 320 which is the driver for the d.c. to a.c. converter. The circuit runs at approximately 20 kilohertz. This value was carefully chosen as a tradeoff between a desire to minimize the size of the transformer and a desire to minimize switching losses in the transistors. As the frequency increases, the size of the transformer can be reduced but the switching losses of the transistors increase. Of course, the supply can run at other frequencies as well. There is an inhibit circuit associated with dual flip-flop 308 such that if a fault condition exists as signalled by fault sense terminal, the clear of the flip-flop is brought down to zero. When the clear of the flip-flop is brought down to zero, both outputs to the d.c. to a.c. converter become zero, shutting down the power supply. The flip-flop must be a dual flip-flop because there must be a way of zeroing the output for the occurrence of a fault condition. If only one flip-flop were used, then when one output went low, the other would be high; accordingly, both cannot be low simultaneously. Cross coupling and a dual flip-flop, be used to get the proper count frequency and still under fault conditions bring the clear down to zero and put zero outputs to both of them.

Figure 5:
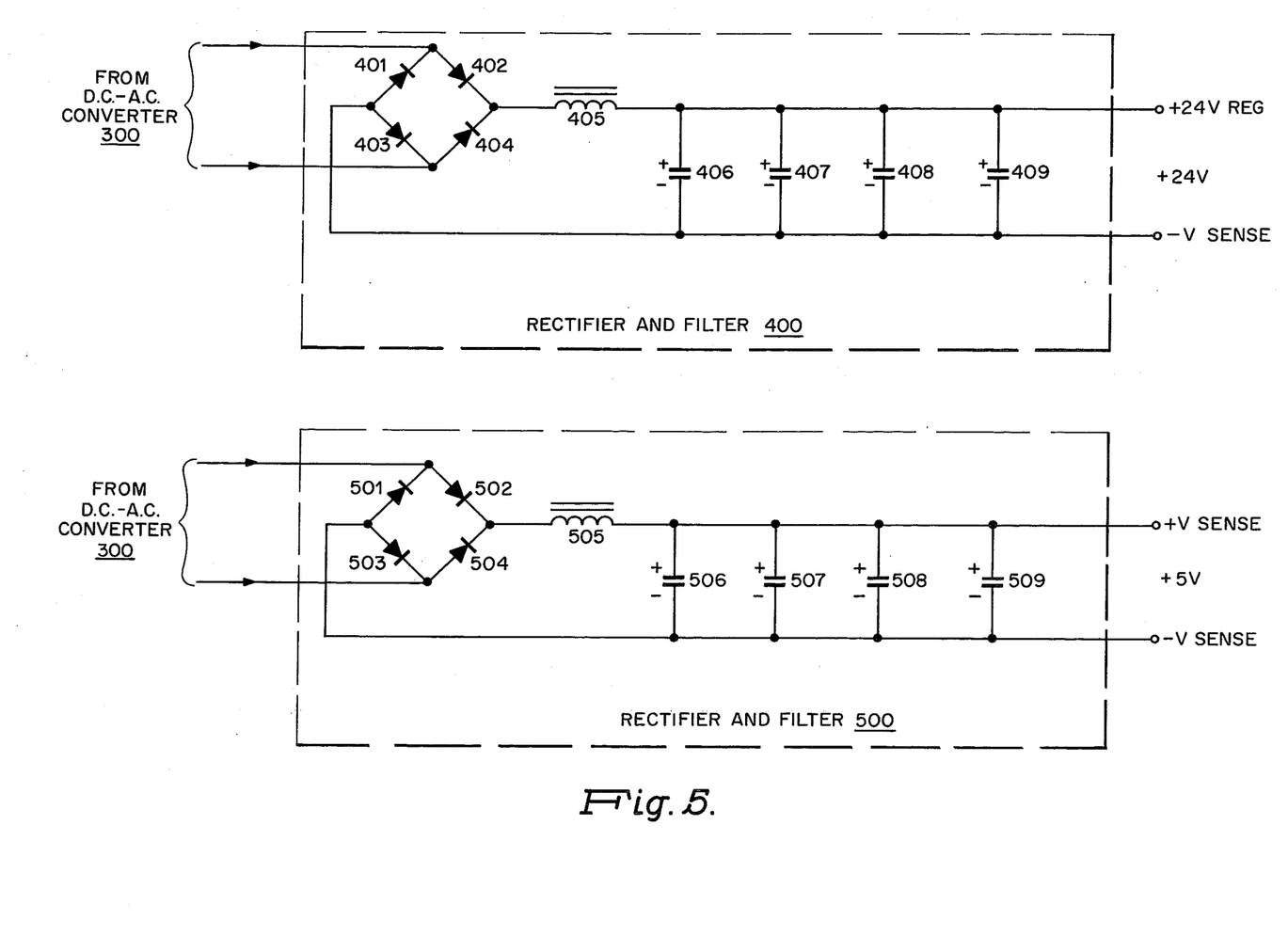
FIG. 5 is a schematic diagram of the rectifier and filter 400 and recitifier and filter 500 of the invention.

Referring now to FIG. 5, which is a schematic diagram for similar rectifier and filter circuits 400 and 500, we see that the only components which differ are the output capacitors. Each circuit utilizes a standard full wave bridge rectifier. The output of each circuit is 8 amperes. Each choke, 405 and 505 is identical. They are typically 100 microhenry chokes rated at 8 amperes, although other values could be used. The capacitors must be different because of voltage considerations. In the 5 volt side, rectifier and filter 500, the capacitors are 510 microfarad 10 volt capacitors and for the 24 volt side, that is rectifier and filter 400, the capacitors are 200 microfarad rated at 30 volts. A full wave bridge is used so that it is not necessary to send a tap to the secondaries of the transformer 334 and therefore minimization of the number of wires in the circuit results. The output voltages of choke input filters of this nature are equal to the product of the input voltage and the duty cycle of the d.c.-a.c. converter. In this case, because the d.c. to a.c. converter is running 100 percent of the time, the output voltage is in effect equal to the voltage on the secondary of the transformer. Additional rectifier and filter circuits can be provided to produce additional output voltages without departing from the scope of the invention.

Figure 6:
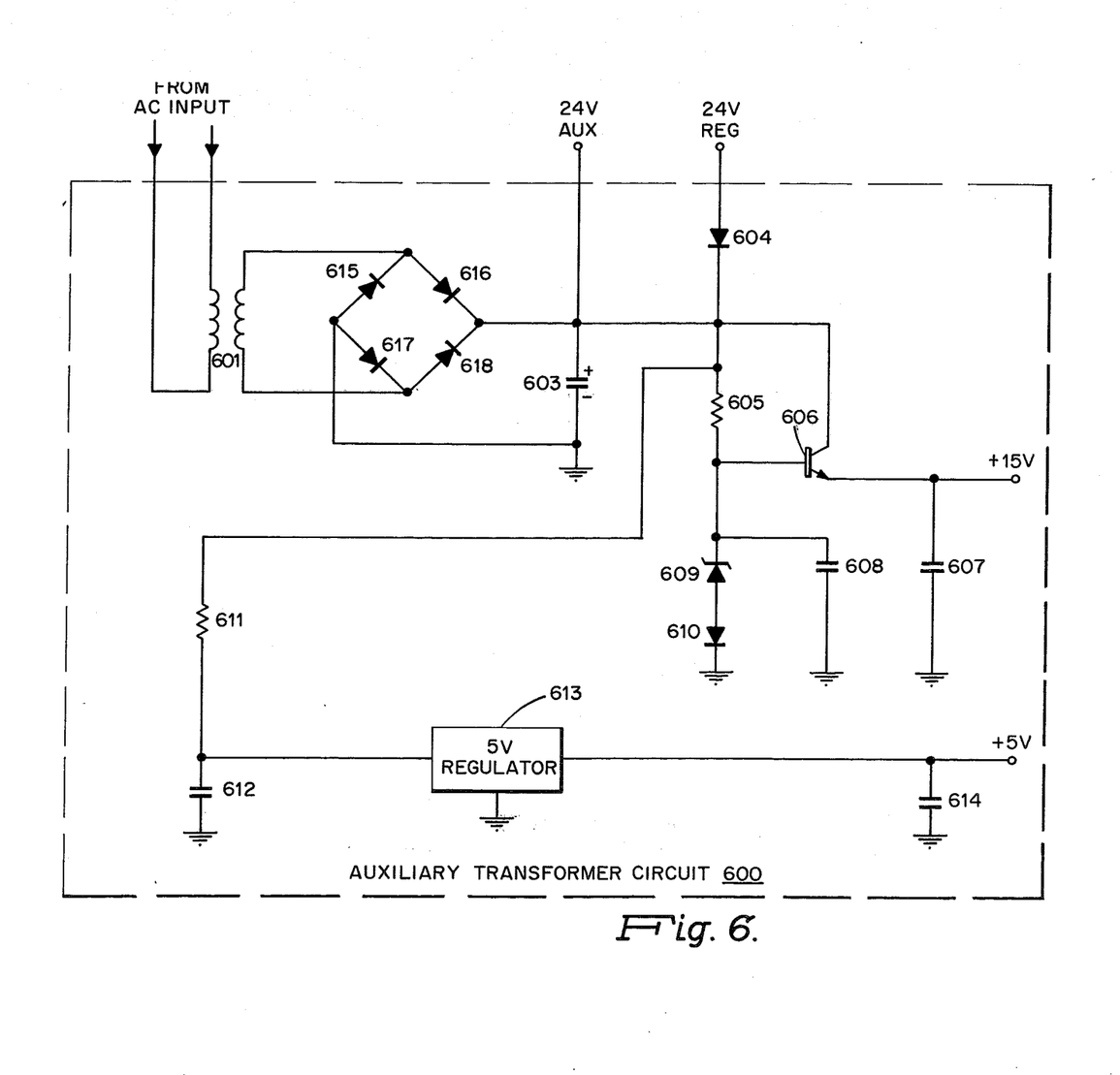
FIG. 6 is a schematic diagram of auxiliary transformer 600 of the invention.

Referring now to FIG. 6, which is a schematic diagram of auxiliary transformer circuit 600, the A.C. input is stepped down to 24 volts by transformer 601 and is rectified by a bridge consisting of diodes 615, 616, 617 and 618. Capacitor 603 is a 220 microfarad filter capacitor. Diode 604 brings the 24 volt regulated output voltage back into the same point When the line is first brought on, the only voltage available to the control loop 700 is via the 50/60 cycle auxiliary transformer 601. When the 24 volt regulator goes up, it now feeds back to the Auxiliary Transformer Circuit 600 and is used as the auxiliary voltage. The ridethrough source for the auxiliary voltage is directly equivalent to the ridethrough source for the entire power supply (1.8 millifarads on capacitor 107 of rectifier and filter 100) because it is coming in via the one point. Therefore, many thousands of microfarads across the bridge are not needed to give the ridethrough capability. The voltages produced by auxiliary transformer 600 are 24 volts, 15 volts regulated and 5 volts regulated.

Figure 7:
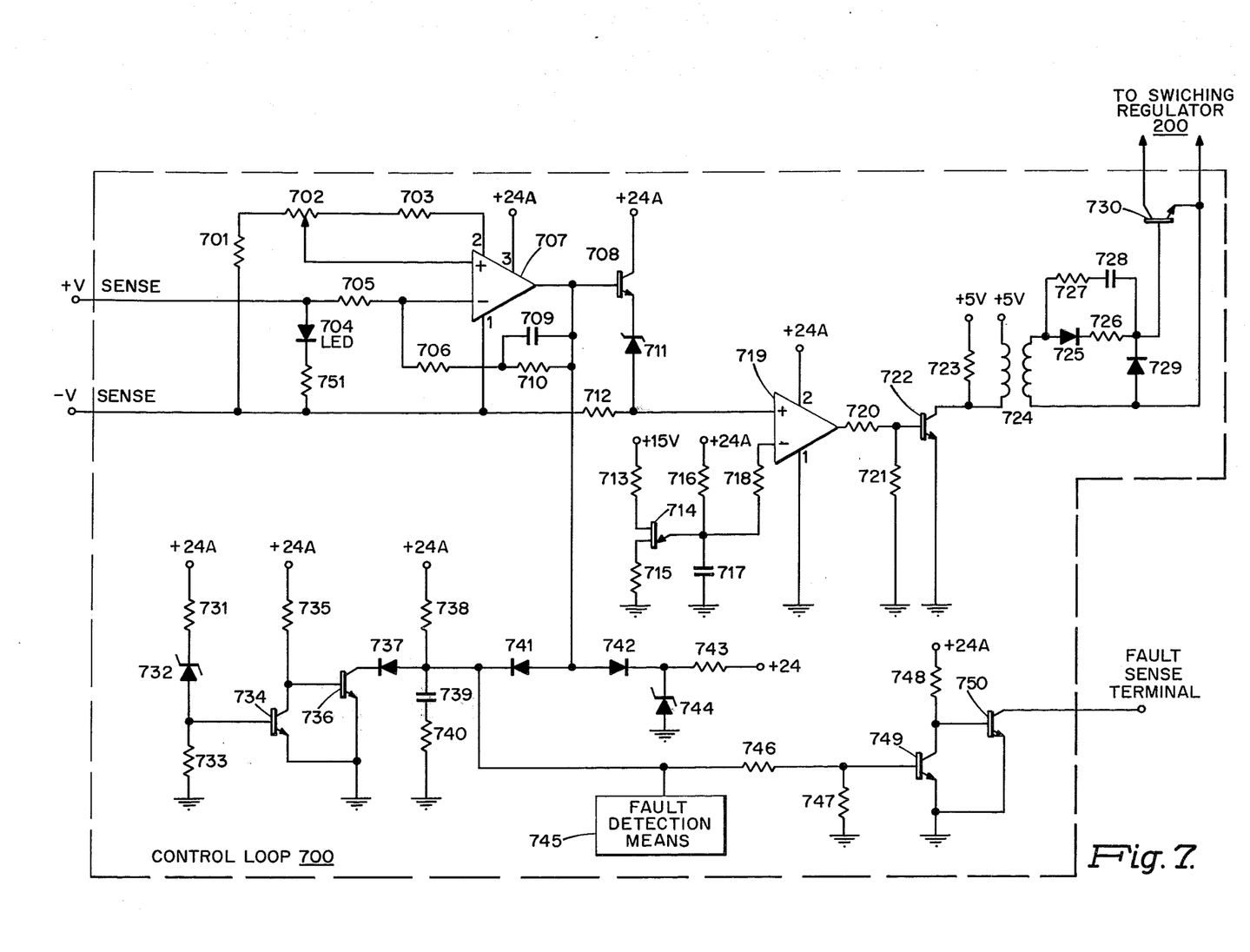
FIG. 7 is a schematic diagram of control loop 700 of the invention.

Regulated now to FIG. 7, which is a schematic diagram of control loop 700, the upper portion of the schematic is the control loop for the switching regulator. The input of that is 5 volts out of the power supply coming in through the +V and −V terminals. This is fed into operational amplifier 707. The output of that is fed indirectly into another operational amplifier 719. On the minus pin of operational amplifier 719 is fed a triangular waveform generated by unijunction transistor 714, resistors 713, 715, 716 and 718 and capacitor 717. When the d.c. voltage on the plus side of operational amplifier 719 is referenced to the minus side, we get a duty cycled square wave as an output from operational amplifier 719. If the +5 volts starts to go high, the plus side of operational amplifier 719 goes low and that decreases the duty cycle thereby decreasing the output voltage of operational amplifier 719. This output voltage is then fed out to transistor 722 and transformer 724, the pulse transformer which drives NPN transistor 730, the predrive for transistor 201 of switching regulator 200. Transformer 724 is required for isolation because transistor 722 is referenced to ground whereas transistor 730 is referenced to the line voltage.

Referring now to the bottom portion of FIG. 7, there is seen a slow voltage buildup sequencing circuit. The reason for needing such a circuit is that the control loop is very slow. The regulator is essentially static, not dynamic because it is important that it not react to any noise, e.g. on the output of the supply. Thus, during initial turn-on of the power supply, we want the 5 volt output to come up slowly. If it came up too fast, it would trigger an erroneous overvoltage fault condition. The circuit operates as follows. When the 24 volts starts to come up, the auxiliary voltage also starts to come up to 24 volts. The output of NPN transistor 736 is being held in a low voltage condition until the 24 volts gets to a sufficient voltage to turn on NPN transistor 734 and send current into the base of NPN transistor 736. When that condition exists, the collector of NPN transistor 736 opens up or in effect goes high. Now RC network 738, 739 and 740 allows the top terminal (i.e., the one facing resistor 738) of capacitor 739 to charge up. This gives a slow voltage buildup on the output of the power supply because operational amplifier 707 is tied via diode 741 to capacitor 739 and therefore cannot get any higher in voltage than capacitor 739 at that particular time. Sometime later, determined by the voltage on capacitor 739 and resistor network 746 and 747, current starts to flow into NPN transistor 749 turning on that transistor which turns off NPN transistor 750 allowing dual flip-flop 308 of d.c.-a.c. converter 300 to start oscillating. Until that time, the clear of the flip-flop is being held low, therefore there is some voltage available to the d.c. to a.c. converter before the d.c. to a.c. converter starts to run. Conventional fault detection means 745 are employed to detect the various fault conditions such as over-voltage, under-voltage, and overcurrent and to cause the power supply to shut down upon the occurrence of a fault condition. (See, for example, U.S. Pat. No. 3,816,810 by E. Friedman and A. Heyman issued on June 11, 1974, entitled "High Current, Regulated Power Supply With Fault Protection."

Preferred Values of Components

The following table lists the preferred values of the components. These values are preferred only and other values may be substituted and still fall within the spirit and scope of the present invention.

| COMPONENT | PREFERRED VALUE |
| --- | --- |
| Resistor 105 | 2 ohms - 10 watts |
| Resistor 106 | 4.7 ohms - 20 watts |
| Capacitor 107 | 1.8 millifarads - 400 volts |
| Resistor 108 | 15 kilo-ohms - 20 watts |
| Resistor 202 | 15 ohms - ½ watt |
| Choke 204 | 36 millihenries |
| Resistor 301 | 20 kilo-ohms |
| Capacitor 302 | .001 microfarads - 100 volts |
| Resistor 303 | 510 ohms |
| Zener Diode 305 | 4.6 volts |
| Resistor 306 | 150 ohms |
| Resistor 307 | 1 kilo-ohm |
| Resistor 309 | 330 ohms |
| Resistor 310 | 330 ohms |
| Capacitor 311 | .01 microfarads |
| Resistor 312 | 510 ohms |
| Resistor 313 | 510 ohms |
| Capacitor 314 | .01 microferads |
| Resistor 315 | 510 ohms |
| Resistor 316 | 510 ohms |
| Capacitor 319 | 2.2 microfarads - 35 volts |
| Resistor 318 | 4.3 ohms - ½ watt |
| Resistor 321 | 10 ohms - ½ watt |
| Capacitor 322 | .1 microfarad - 35 volts |
| Capacitor 323 | .01 microfarads - 35 volts |
| Resistor 324 | 10 ohms - ½ watt |
| Resistor 333 | .3 ohms - 7 watts |
| Choke 405 | .1 millihenry |
| Capacitors 406, 407, 408 and 409 | 220 microferads - 30 volts |
| Choke 505 | .1 millihenry |
| Capacitors 506, 507, 508 and 509 | 510 microfarads - 10 volts |
| Capacitor 603 | 220 microfarads - 30 volts |
| Resistor 605 | 510 ohms |
| Zener Diode 609 | 15 volts |
| Capacitor 608 | .1 microfarad - 35 volts |
| Capacitor 607 | 2.2 microfarads - 35 volts |
| Resistor 611 | 120 ohms - 3 watts |
| Capacitor 612 | .1 microfarad - 35 volts |
| Capacitor 614 | 2.2 microfarads - 35 volts |
| Resistor 701 | 2 kilo-ohms |
| Resistor 702 | 1 kilo-ohm, ¾ watt |
| Resistor 703 | 1 kilo-ohm |
| Resistor 705 | 510 ohms |
| Resistor 706 | 20 kilo-ohms |
| Resistor 751 | 200 ohms |
| Resistor 710 | 510 kilo-ohms |
| Resistor 712 | 3 kilo-ohms |
| Resistor 713 | 510 ohms |
| Resistor 715 | 150 ohms |
| Resistor 716 | 51 kilo-ohms |
| Capacitor 717 | .01 microfarads |
| Resistor 718 | 2 kilo-ohms |
| Resistor 720 | 1.5 kilo-ohms |
| Resistor 521 | 510 ohms |
| Resistor 723 | 510 ohms |
| Resistor 726 | 24 ohms |
| Resistor 727 | 24 ohms |
| Capacitor 728 | .1 microfarad |
| Resistor 731 | 1 kilo-ohm |
| Resistor 733 | 1 kilo-ohm |
| Resistor 735 | 10 kilo-ohms |
| Resistor 738 | 20 kilo-ohms |
| Capacitor 739 | 2.2 microfarads - 35 volts |
| Resistor 740 | 510 ohms |
| Resistor 743 | 3 kilo-ohms |
| Zener diode 744 | 4.3 volts |
| Resistor 746 | 51 kilo-ohms |
| Resistor 747 | 10 kilo-ohms |
| Resistor 748 | 20 kilo-ohms |

DETAILED DESCRIPTION OF THE DRAWINGS

Referring now to FIG. 2, the rectifier and filter 100, one side of the A.C. input voltage is applied to the cathode of diode 101 and the anode of diode 102. The other side of the A.C. input voltage is applied to the cathode of diode 103 and the anode of diode 104. The anode of diodes 101 and 103 are connected together and also via resistor 106 as an output to switching regulator 200. The cathodes of diodes 102 and 104 are interconnected and are sent via resistor 105 as the other output to switching regulator 200. The positive side of capacitor 107 is connected to the upper output to switching regulator 200 and the negative side of capacitor 107 is connected to the lower output to switching regulator 200. Resistor 108 is connected in parallel across capacitor 107.

Referring now to FIG. 3, switching regulator 200, the collector of heat sink NPN transistor 201 is connected via the upper input line from rectifier and filter 100. The lower input line is connected via diode 203 to the emitter of NPN transistor 201 with the cathode of diode 203 connected to the emitter of transistor 201. Resistor 202 is connected across the base and emitter of transistor 201. The lower input line from rectifier and filter 100 is also the lower output line to d.c.-a.c. converter 300. The collector and base of transistor 201 are connected as output lines to control loop 700. The emitter of transistor 201 is connected via choke 204 as the upper output line to d.c.-a.c. converter 300. Capacitor 205 connects the upper and lower output lines to d.c.-a.c. converter 300.

Referring now to FIG. 4, d.c.-a.c. converter 300, dual flip-flop 308 is a standard dual JK Clock Reset $\overline{Q}Q$ flip-flop, (for example, model 7473 made by Fairchild). 15 volts is applied to the terminal connected through resistor 301 to the emitter of uni-junction transistor 304. The emitter of uni-junction transistor 304 is also connected through capacitor 302 to ground. Base 2 of uni-junction transistor 304 is connected through resistor 303 to a +15 volt terminal. Base 1 of uni-junction transistor 304 passes through Zener diode 305 to ground with the cathode of Zener diode 305 connected to base 1 of uni-junction transistor 304. Base 1 of uni-junction transistor 304 is also connected through resistor 306 to ground and directly to the clock terminals of both the portion of dual flip-flop 308, and to the clock and lower portion of dual flip-flop 308. The J and K terminals of the upper portion of dual flip-flop 308 are connected together and through resistor 307 to a +5 volt terminal. Fault sense terminal is connected to the Reset terminal of the upper portion of dual flip-flop 308 and to the Reset terminal of the lower portion of dual flip-flop 308. The $\overline{Q}$ terminal of the upper portion of dual flip-flop 308 is connected to the K terminal of the lower portion of dual flip-flop 308. The Q terminal of the upper portion of dual flip-flop 308 is connected to the J terminal of the lower portion of dual flip-flop 308 and via resistor 309 to a +5 volt terminal. It is also connected via resistors 312 and 313 to ground, and through resistor 312 to the base of NPN transistor 317. Capacitor 311 is connected in parallel across resistor 312. The emitter of NPN transistor 317 is connected to ground. The collector of NPN transistor 317 is connected to one end of the primary of transformer 320. The other terminal of the primary of transformer 320 is grounded and also connected to the collector of NPN transistor 335 whose emitter is also connected to ground. The base of transistor 335 is connected via resistor 316 to ground, via resistor 315 to the Q terminal of the lower portion of dual flip-flop 308, and via resistors 315 and 310 to a +5 volt terminal. Capacitor 314 is connected in parallel across resistor 315. A center tap of the primary of transformer 320 is connected via resistor 318 to a +15 volt terminal and is also connected via resistor 318 and capacitor 319 to ground. One end of the secondary of transformer 320 is connected via resistor 321 to the base of NPN transistor 331, and capacitor 322 is connected in parallel across resistor 321. The other terminal of the secondary of transformer 320 is connected via resistor 324 to the base of NPN transistor 332, and capacitor 323 is connected in parallel across resistor 324. A center tap of the secondary of transformer 320 is connected via resistor 333 to the emitter of NPN transistor 331 and 332. The base of transistor 331 is also connected via diodes 325 and 326 to the negative terminal of the third secondary of transformer 334. The positive terminal of the third secondary of transformer of 334 is connected via diodes 330 and 329 to the base of transistor 332. The anode of diode 325 is connected to the base of transistor 331 and that the anode of diode 326 is connected to the cathode of diode 325. The anode of diode 329 is connected to the base of transistor 332 and that the anode of diode 330 is facing the cathode of diode 329. The positive terminal of the third secondary of transformer 334 is connected via diodes 328 and 327 to the negative terminal of the third secondary of transformer 334 with the anode of diode 328 connected to the positive terminal of the third secondary of transformer 334 and the cathode of diode 327 connected to the cathode of diode 328. The cathode of diode 328 is connected to the center tap of the secondary of transformer 320 and is also connected to the upper output line to switching regulator 200. The anode of diode 327 is connected to the cathode of diode 326. The collector of transistor 332 is connected to the negative terminal of the primary of transformer 334. The positive terminal of the primary transformer 334 is connected to the collector of transistor 331 and the center tap of the primary of tranformer 334 is connected to the lower half of the output lines to switching regulator 200. A first secondary of transformer 334 is connected to rectifier and filter 400 and that a second secondary of transformer 334 is connected to rectifier and filter 500.

Referring now to FIG. 5, one input from d.c.-a.c. converter 300 is fed into rectifier and filter 400 with the upper line connected to the interconnected cathode of diode 401 and anode of diode 402. The lower line from d.c.-a.c. converter 300 is connected to the interconnected cathode of diode 403 and the anode of diode 404. The interconnected anodes of diodes 401 and 403 are connected to the lower output line of rectifier and filter 400 which becomes the −V sense terminal. The interconnected cathodes of diodes 402 and 404 are connected via choke 405 to the upper the output line of rectifier and filter 400 which becomes the ±24 volt regulated output terminal. Four capacitors, 406, 407, 408 and 409 are interconnected in parallel across the upper and lower output lines of rectifier and filter 400 with the positive terminal of each capacitor connected to the upper output line and the negative terminal of each capacitor connected to the lower line. Referring now to rectifier and filter 500, the upper input line is connected to the interconnected cathode of diode 501 and anode of diode 502, the lower input line is connected to the interconnected cathode of diode 503 and anode of diode 504. The interconnected anode of diodes 501 and 503 connected to the lower output line of rectifier and filter which becomes the −V sense terminal. The interconnected cathodes of diodes 502 and 504 are connected via choke 505 to the upper output line of rectifier and filter 500 and in effect become the +V sense terminal. Four capacitors, that is 506, 507, 508 and 509 are interconnected in parallel between the upper and lower output lines of rectifier and filter 500 with the plus terminal of each connected to the upper output line and the negative terminal of each connected to the lower output line.

Referring now to FIG. 6, the A.C. input is connected directly to the primary of transformer 601. One terminal of the secondary of transformer 601 is connected to the interconnected cathode of diode 615 and anode of diode 616. The other terminal of the secondary of transformer 601 is connected to the interconnected cathode of diode 617 and anode of diode 618. The interconnected cathodes of diodes 616 and 618 are connected via capacitor 603 to ground, they are connected to a +24V auxiliary terminal, and they are connected via diode 604 to a 24V regulated terminal. They are connected via resistor 605 to the base of NPN transistor 606. They are connected to the collector of transistor 606. Notice that the plus terminal of capacitor 603 is connected to this interconnection point as is the cathode of diode 604. The interconnected anodes of diodes 615 and 617 are connected to ground and to the negative terminal of capacitor 603. The interconnected cathode of diodes 616 and 618 are also connected via resistors 611 and capacitor 612 to ground and through resistor 611 and 5 volt regulator 613 to a + 5V terminal and through resistor 611, the 5 volt regulator 613 and capacitor 614 to ground. Five volt regulator 613 is a standard regulator with input of up to 40 volts, output of 5 volts, and ground, (for example, LM 309 made by National). The base of NPN transistor 606 is connected via Zener diode 609 and diode 610 to ground and is also connected via capacitor 608 to ground. The cathode of Zener diode 609 is connected to the base of transistor 606 and the anode of diode 610 is connected the anode of Zener diode 609. Finally, the emitter of transistor 606 is connected to a +15 volt terminal via capacitor 607 to ground.

Referring now to FIG. 7, the +V sense terminal is connected to the anode of light emitting diode 704 and is connected via resistor 705 to the negative terminal of operational amplifier 707. The −V sense terminal is connected via resistor 751 to the cathode of light emitting diode 704, directly to a first supply terminal of operational amplifier 707 and, via resistor 712 and Zener diode 711 to the emitter of NPN resistor 708. The cathode of light emitting diode 704 is connected via resistors 751, 701, 702, and 703 to a second supply terminal of operational amplifier 707. A third supply terminal of operational amplifier 707 is connected to a plus 24A terminal. The positive terminal of operational amplifier 707 is connected to the variable connection point of potentiometer 702. The negative terminal of operational amplifier 707 is connected via resistor 706 and resistor 710 to the output terminal of operational amplifier 707 which is also connected to the base of NPN transistor 708. Capacitor 709 is connected in parallel across resistor 710. The collector of transistor 708 is connected to a +24 auxiliary terminal. It is noted that the cathode of Zener diode 711 is facing the emitter of NPN transistor 708. The emitter of NPN transistor 708 is connected via Zener diode 711 to the positive terminal of operational amplifier 719. A first supply terminal of operational amplifier 719 is connected to ground. A second supply terminal of operational amplifier 719 is connected to a plus 24A terminal. The negative terminal of operational amplifier 719 is connected through resistor 718 to the emitter of uni-junction transistor 714, through resistor 718 and capacitor 717 to ground, and through resistors 718 and 716 to a +24A terminal. Base 2 of uni-junction transistor 714 is connected via resistor 713 to a +15 volt terminal. Base 1 of uni-junction transistor 714 is connected via resistor 715 to ground. The output terminal of operational amplifier 719 is connected through resistor 720 to the base of NPN transistor 722, and through resistors 720 and 721 to ground. The emitter of NPN transistor 722 is connected to ground. The collector of NPN transistor 722 is connected via resistor 723 to a +5V terminal and directly to one terminal of the primary of transformer 724, the other terminal of which is connected to a +5V terminal. One terminal of the secondary of transformer 724 is connected to the emitter of NPN transistor 730 and the second terminal is connected, through diode 725 and resistor 726 to the base of transistor 730. It is noted that the cathode of diode 725 is connected to resistor 726. The second terminal of the secondary of transformer 724 is also connected via resistors 727 and capacitor 728 to the base of transistor 730. Diode 729 is connected between the emitter of transistor 730 and the base of transistor 730 with the cathode of diode 729 connected to the base of transistor 730. The emitter of transistor 730 is connected to the second output line to switching regulator 200, and the collector of transistor 730 is connected to the first output line to switching regulator 200. The base of NPN transistor 734 is connected via resistor 733 to ground, and via Zener diode 732 and resistor 731 to a +24A terminal, with the cathode of Zener diode 732 connected to resistor 731. The collector of transistor 734 is connected to the base of NPN transistor 736, and via resistor 735 to a +24A terminal. The emitter of transistor 734 is connected to ground and to the emitter of transistor 736. The collector of transistor 736 is connected through 737 and resistor 738 to a +24A terminal. Note that the anode of diode 737 is connected to the resistor 738. The anode of diode 737 is also connected via capacitor 739 and resistor 740 to ground and is connected to fault detection means 745 and is connected via diode 741 to the output terminal of operational amplifier 707. It is noted that the anode of diode 741 is connected to the output terminal of operational amplifier 707. The anode of diode 741 is also connected to the anode of diode 742. The cathode of diode 742 is connected resistor 743 to a +24A terminal and to the cathode of Zener diode 744. The anode of Zener diode 744 is connected to ground. Fault detection means 745 is also connected via resistor 746 and through resistor 747 to ground. The other side of resistor 747 is connected to the base of NPN transistor 749, the emitter of which is connected to ground and to the emitter of NPN transistor 750. The collector of transistor 749 is connected to the base of transistor 750 and through resistor 748 to a +24A terminal. The collector of transistor 750 is connected to fault sense terminal.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An electronic power supply comprising:
   input rectifier and filter means coupled to an alternating current (a.c.) input to convert said alternating current into direct current, said input rectifier and filter means including electrical storage means for providing ridethrough capability for the power supply;
   switching regulator means coupled to said input rectifier and filter means, said switching regulator means including a first high voltage transistor with its collector connected to the relatively positive output line from the input rectifier and filter means and its emitter coupled to a first terminal of a choke element for limiting peak currents emitted by the emitter of said first transistor;
   means to convert direct current to alternating current coupled to said switching regulator means, said d.c.-a.c. converter means including a second and a third high voltage transistor, a transformer and means to inhibit simultaneous turn-on of said second and said third transistors, said transformer having a primary winding with a center tap connected to a second terminal of said choke element, opposite terminals of said primary winding connected to the collectors of said second and third transistors respectively, the emitters of said second and said third transistors connected to the relatively negative output line from said input rectifier and filter means, said inhibiting means including a secondary winding of said transformer and a pair of diodes coupled between each terminal of said secondary winding and the base of each of said second and said third transistors respectively;
   a plurality of output rectifier and filter circuits, each of which is coupled to said d.c.-a.c. converter means and each of which produces a preselected output voltage;
   a control loop coupled to said switching regulator means and to at least one of said output rectifier and filter circuits, said control loop providing a regulation signal to said first transistor for varying the duty cycle of said first transistor, said regulation signal responsive to the voltage level of said one output rectifier and filter circuit; and
   an auxiliary transformer circuit coupled to the a.c. input and to said control loop, said auxiliary transformer circuit providing power to said control loop before said output voltages have reached their operating levels.

2. The power supply of claim 1 wherein said control loop further includes fault detection means for shutting off said power supply and a slow voltage build-up sequencing circuit for preventing erroneous generation of an overvoltage fault condition signal during initial turn-on of the power supply.

3. The power supply of claim 2 wherein said d.c.-a.c. converter means further comprises an oscillator for driving said converter means, said oscillator comprising a uni-junction transistor circuit, a dual flip-flop, two NPN transistors, and a second transformer, said uni-junction transistor circuit providing a switching signal to said dual flip-flop, said two NPN transistors responsive to complementary outputs of said dual flip-flops respectively, said two NPN transistors alternately driving said transformer to opposite polarity, said second transformer having a secondary winding coupled to the bases of said second and said third transistors, said fault condition signal causing an initialization of said dual flip-flop.

4. The power supply of claim 1 wherein said variation of the duty cycle of said first transistor is achieved by producing said regulation signal by comparing in a voltage comparator the output voltage level of said one output rectifier and filter circuit with a triangular waveform generated by a uni-junction transistor circuit within said control loop.

5. The power supply of claim 1 wherein said switching regulator means further comprises a capacitor coupled between the second terminal of said choke element and the relatively negative output line from the input rectifier and filter means, and a diode having its cathode coupled to said first terminal of said choke element and its anode coupled to the relatively negative output line from the input rectifier and filter means.

6. An electronic power supply comprising:
   input rectifier and filter means coupled to an alternating current input to convert said alternating current input into direct current, said input rectifier and filter means comprising electrical storage means for providing ridethrough capability for the power supply when the power supply is shut-off;
   switching regulator means coupled to a pair of output lines from said input rectifier and filter means, said switching regulator means comprising a first high voltage transistor coupled to gate the output from said input rectifier and filter means, an inductor coupled to limit the path currents passing through said first transistor, a capacitor for filtering the output voltage of said switching regulator means, and a diode coupled so as to provide a current path when said first transistor is non-conducting;
   means to convert direct current to alternating current coupled to said switching regulator means, said d.c.-a.c. converter means comprising:
   a second and a third high voltage transistor;
   a first transformer;
   an oscillator comprising a uni-junction transistor for providing a switching signal, a dual flip-flop responsive to said switching signal, two NPN transistors responsive to complementary outputs of said dual flip-flop such that only one of said two NPN transistors is conducting at a time, and a second transformer driven by said two NPN transistors; and
   means to inhibit the simultaneous turn-on of said second and said third high voltage transistors comprising a secondary winding of said first transformer and a pair of diodes coupling each terminal of said secondary winding to the base of each of said second and said third high voltage transistors respectively;
   a plurality of output rectifier and filter circuits, each of which is coupled to a secondary winding of said first transformer and each of which produces a preselected output voltage;
   a control loop coupled to said switching regulator means and to at least one of said output rectifier and filter circuits, said control loop providing a regulation signal responsive to the output voltage level of said one output rectifier and filter circuit and applied to said first high voltage transistor to vary the duty cycle of said first high voltage transistor, said regulation signal obtained by comparing in a voltage comparator the output voltage level of said one output rectifier and filter means with a triangular waveform generated by a uni-junction transistor within said control loop; said control loop further comprising fault detection means for shutting off said power supply and a slow voltage build-up sequencing circuit for preventing the erroneous generation of an overvoltage fault condition during initial turn-on of the power supply, said slow voltage build-up sequencing circuit comprising a pair of transistors connected collector-to-base, a grounded capacitor coupled to a pair of transistors, and a diode coupled to said capacitor and said fault detection means; and an auxiliary transformer circuit coupled to the a.c. input and to said control loop for providing power to said control loop before said output voltages have reached their operating levels.

\* \* \* \* \*